United States Patent Office 3,662,014
Patented May 9, 1972

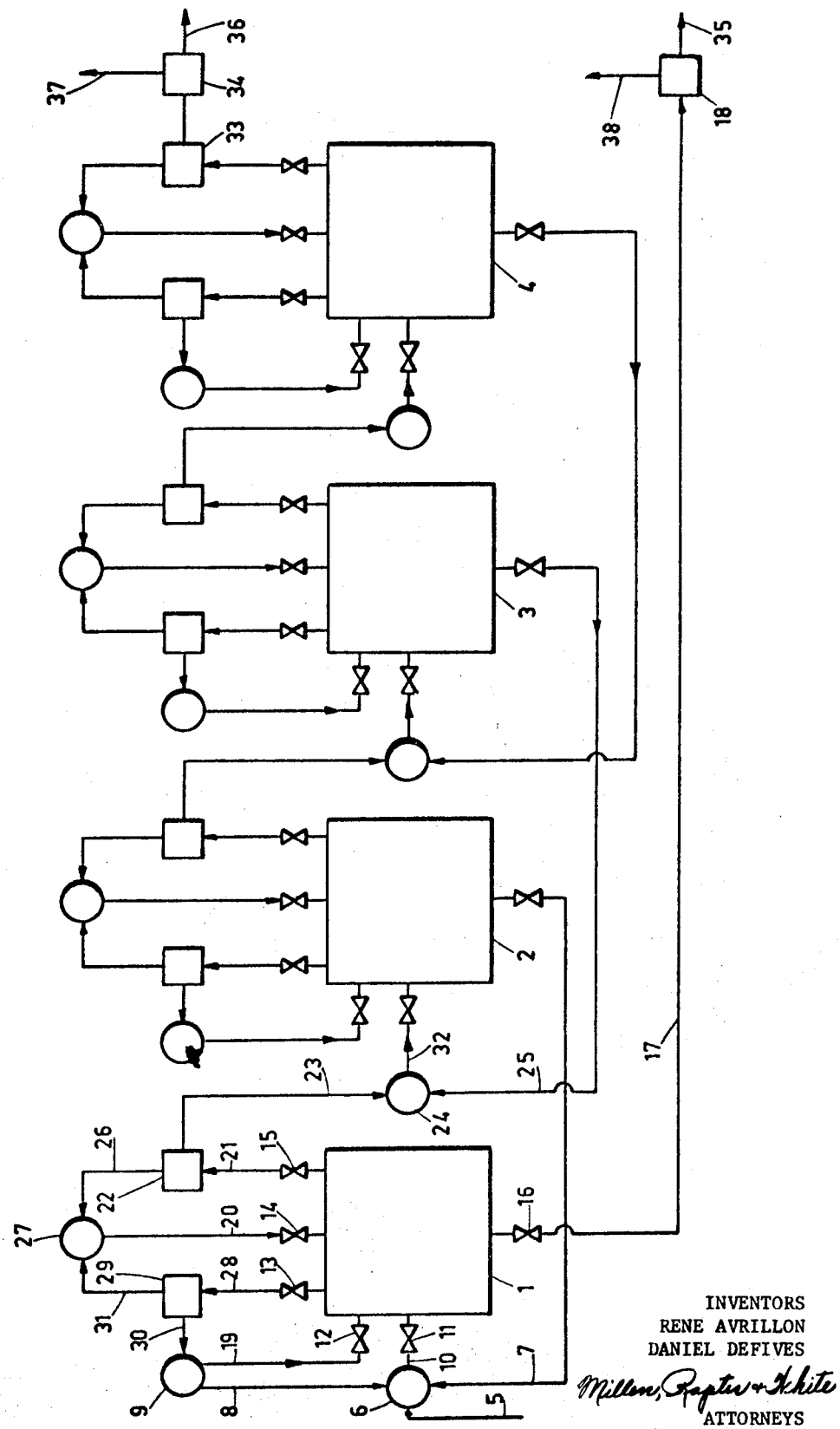

3,662,014
ADSORBING COMPOSITIONS, THEIR MANUFACTURE AND USE IN A PROCESS FOR SEPARATING ALKYLBENZENES FROM MIXTURES THEREOF
Rene Avrillon, Maisons Laffitte, and Daniel Defives, Paris, France, assignors to Institut Francais du Petrole des Carburants et Lubrifiants, Malmaison, Hauts-de-Seine, France
Filed May 7, 1970, Ser. No. 35,392
Claims priority, application France, May 9, 1969, 6915178
Int. Cl. C07c 7/12; B01j 11/40
U.S. Cl. 260—674 SA                  14 Claims

ABSTRACT OF THE DISCLOSURE

The invention relates to new adsorbents comprising a zeolite base, e.g., a CaX zeolite, having pore diameters between 6 and 10 A., preferably about 8 A., and an active substance of the general formula

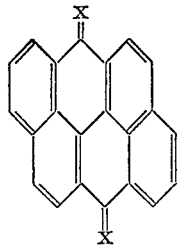

wherein X is an oxygen atom or a =N—R group, R being a monovalent hydrocarbon radical.

Examples of the active substances are anthanthrone and N,N'-diphenyl-anthanthrimine.

The adsorbents may further contain other substances such as water, pyranthrone or pyromellitic anhydride which improve their efficiency.

---

This invention relates to a new type of selective adsorbing products and the methods of preparation thereof, as well as to a new process using such products for carrying out the separation of hydrocarbons and more particularly of alkylbenzenes, which cannot be separated easily by conventional methods, from mixtures thereof. The considered alkylbenzenes cannot be separated easily by distillation due to their similar boiling points or the formation of azeotropes, or it may be impossible to separate them completely by crystallization, due to the formation of eutectics, as in the case, for example, of isomeric alkylbenzenes.

More particularly this invention relates to the separation is isomeric alkylbenzenes containing eight carbon atoms, namely orthoxylene, metaxylene and ethylbenzene.

Up to now, according to a known process, orthoxylene and ethylbenzene may be separately extracted by distillation in columns having a great number of plates. Para-xylene may be extracted by crystallization with a limited yield due to the formation of an eutectic. Meta-xylene is not separated industrially. The residues with a high meta-xylene content are often converted by isomerization to ortho-xylene and para-xylene but this conversion is limited by a chemical equilibrium and would be more efficient if carried out on a more concentrated meta-xylene feed.

The difficulty for achieving the separation, by a conventional procedure, of individual C$_8$ alkylbenzenes and the poor yield obtained have favoured further researches of new fractionation methods. One of them, for example, provides for a quantitative extraction of meta-xylene but para-xylene must be separated from the other isomers, particularly from ethylbenzene, by distillation. This method is based on the formation of a complex between meta-xylene and boron fluoride in the presence of hydrofluoric acid, which is a very corrosive substance.

There has also been proposed to extract para-xylene by adsorption thereof on synthetic zeolites but the selectivity of adsorption of said zeolites with respect to isomeric alkylbenzenes is very low. As a matter of fact the molecules of said alkylbenzenes have diameters very close to each other and no zeolite is known whose pore useful diameter is such as to leave passage to some of these alkylbenzenes only and not to the others.

The present invention is based on the discovery of a new type of selective adsorbents for mixtures of alkylbenzenes and particularly of a very selective adsorption agent whereby para-xylene can be separated from the other isomers or even said isomers can be separated from one another.

It is therefore an object of this invention to provide a family of products capable of selectively adsorbing the constituents of a mixture of alkylbenzenes. The selective effect is obtained as a result of different adsorption velocities.

These new adsorption agents are composed of a zeolite having a pore diameter of 6 to 10 A. (preferably about 8 A.) and at least one anthanthrenic compound of the general formula:

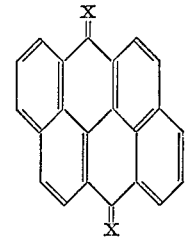

wherein X is an oxygen atom or a =N—R group, R being a monovalent hydrocarbon radical, for example one of the following groups: =N—CH$_3$=N—C$_2$H$_5$ and

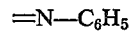
=N—C$_6$H$_5$

The compound will be referred to hereinafter as "active substance."

The proportion of active substance is usually between 0.001% and 1% by weight with respect to the zeolite, athough an excess of acid substance such as a proportion of 5% for example, does not alter the selectivity of the adsorbents of this invention.

The efficiency of the adsorbents of this invention can be improved by adding other substances thereto. The preferred added substances are water, pyranthrone and preferably pyromellitic anhydride. Water may be used for example in a proportion of 0.001% to 0.5% by weight with respect to the zeolite, pyranthrone and pyromellitic acid in proportions of 0.001 to 5% and preferably 0.01 to 1%.

These substances have mainly the effect of decreasing the adsorption velocity, which results both in more easily controllable contact times and in an improved selectivity when the adsorbents are in the form of agglomerated powder.

As examples of zeolites to be used according to the invention are to be mentioned the CaX (or 10X) zeolite having a pore diameter of about 8 A., and the NaY molecular sieve.

It can be observed, as a general rule, that these zeolites have a pore diameter greater than the diameter of the isometric alkylbenzene molecules.

For the separation of isomeric alkylbenzenes of 8 carbon atoms the preferred adsorbent is composed of zeolite CaX (with a pore diameter of about 8 A.) and anthanthrone (of the above formula wherein $X=0$).

The anthanthrenic compound is generally used in an amount of about 0.01% to 0.5% and preferably from 0.05 to 0.1% by weight with respect to the zeolite, an excess of this compound being not detrimental to the efficiency of the product. The four $C_8$ isomers can be adsorbed by this product with relative velocities increasing in the following order: ortho-xylene, meta-xylene, ethylbenzene and para-xylene.

Pure zeolites themselves exhibit a slightly selective adsorption power since they tend to adsorb ortho-xylene and meta-xylene better than ethylbenzene and para-xylene, in contrast to the product containing the anthanthrene compound.

This is an indication that the adsorbing products according to this invention exhibit quite new properties.

In order to obtain an adsorbing product in conformity with the invention a zeolite either as such, i.e. as a crystalline powder, or agglomerated, preferably in the absence of binding agent, is contacted with an anthanthrene compound in a fluid state, i.e. in a vaporized state or in solution. It is preferred to operate with a protection against atmosphere with a well dehydrated zeolite since the adsorption properties of the zeolites are very sensitive to moisture. It is therefore convenient to complete the dehydration of the molecular sieves, as available in the trade, before using them. This can be achieved by heating them between 200 and 600° C., preferably between 200 and 400° C. while removing the steam evolved by use of a vacuum pump, a cyrogenic trap or a circulation of a dry gas such as nitrogen or methane. The removal of the last traces of water is time-consuming and may require furthering the treatment for several hours. With respect to the deposit of active substance, one of the simplest procedures for carrying it out consists of vaporizing the substance when in contact with the zeolite, optionally under reduced pressure. Very low vapor pressures may be sufficient. There can also be prepared a mixture, as homogeneous as possible, of the zeolite in powder or granular form with the active substance in powder form, the amount of active substance per 100 grams of zeolite being at least about 0.01 gram and preferably between 0.1 and 5 grams. This mixture is then heated, as far as possible protected from moisture and oxygen of air and under reduced pressure, up to the temperature required for obtaining a vapor pressure of active substance preferably of 0.01 to 100 millimeters of mercury. It is of course convenient to known in advance the vapor pressure of the substance as a function of its temperature. The adsorption of the molecules of active substance which have come into contact with the surface of the zeolite, is immediate but in practice, the conversion of the mixture to a new adsorbing product depends on the diffusion of the vapors. The conversion is very fast when using an intimate mixture of powders and when the vapor pressure of the active substance is far higher than the pressure of the initially present gas. In the case of grains the complete conversion may require several minutes and is the longer as the vapor pressure is the lower. Another simple way of depositing the active substance consists of contacting the zeolite with a solution of said substance. The used solvent must not be detrimental to the deposit or for a later use of the adsorbing product. This implies, in particular that it must not be too strongly adsorbable. The aromatic hydrocarbons are therefore suitable and the simplest way will be to use, as solvents, the alkylbenzenes the separation of which is desired. The amount of active substance to be used is substantially the same as when it is used in a solid state. As stated before this amount is very low as compared to that of the zeolite. Accordingly, even very diluted solutions may be suitable. The practical way of preparing the adsorbents according to the invention will be more clearly apparent from Examples 1 and 2 herebelow. The deposit of the additional substance improving the effect of the active substance may be formed simultaneously or after the doposit of said active substance according to the case. Water and pyromellitic anhydride, for example, will be preferably adsorbed after the active substance whereas pyranthrone may be deposited simultaneously.

Another object of the present invention is the fractionation of hydrocarbons mixtures, and more precisely of alkylbenzenes mixtures, based on the properties of the new adsorbing products according to the invention.

In practicular this process provides for the separation of ortho-xylene, meta-xylene, para-xylene and ethylbenzene from mixtures thereof. It consists, basically, of first contacting the mixture of alkylbenzenes which are to be separated, in the liquid or vapor phase, with a selective adsorbing product according to the invention, for a limited time, then of recovering a non-adsorbed fraction enriched with certain constituents, and finally of desorbing a fraction enriched with other constituents. If the fractionation is insufficient, the recovered fractions can be further processed and so on. Whereas the conventional selective adsorbents exhibit an equilibrium selectivity, the new adsorbents presently used exhibit, on the contrary, a selectivity which is essentially of a kinetic or diffusional type even when a slight equilibrium selectivity is observed accessorily.

When using this new type of adsorbents, the concentrations of a constituent in the adsorbed and non-adsorbed phases in a first period differ more and more from each other and then become closer and closer up to the equilibrium. It is accordingly necessary to limit the time of contact between the adsorbent and the treated mixture in order to avoid that the equilibrium be attained. In most cases the best results are obtained with an adsorption rate corresponding to 30 to 80% of the saturation of the adsorbent. When the fractionation is carried out in several stages it is convenient to optimize this contact time particularly when the treated mixture contains more than two constituents.

The process is carried out with one or more fixed beds of adsorbents contained in vessels called adsorption units. The alkylbenzenes feed to be fractionated is introduced in an adsorption unit in the liquid or vapor state and optionally diluted with a saturated hydrocarbon, preferably a normal paraffin having 3 to 8 carbon atoms. The feed is contacted with the adsorbent for a limited time, generally from 1 second to 1 hour, at a temperature preferably between $-20°$ C. and 300° C. and under a pressure which is advantageously the atmospheric pressure or a lower one but which can be higher, as for example when it is desired to use in a liquid state a diluent which is normally in a gaseous state. The non-adsorbed fraction of alkylbenzenes is then removed from the bed; in order to obtain a more complete recovery it is of interest to pass a diluent such as hereabove defined through the bed. The desorption of the adsorbed fraction of the alkylbenzenes is carried out thereafter. There is used, for this purpose, a polar (or polarisable) compound having a normal boiling point of at most 100° C., such as, for example, water, ammonia or carbon dioxide.

Water is preferred with anthanthrone and ammonia with anthanthrimines. The temperature conditions during the desorption are generally substantially the same as during the adsorption. However, when the desorption agent is steam, it is necessary to increase the temperature. The pressure conditions are dependent on the type of desorption agent used. Except when water is used, the desorption agent is more efficient when the operating pressure becomes closer to its liquefaction pressure; the desorption is slower and less complete when the partial pressure of the desorption agent (with the exception of water) is smaller than one fourth of its liquefaction pressure. The desorbed alkylbenzenes may be recovered as a single fraction or optionally, as two or more successive fractions of different compositions; as a matter of fact it does generally exist, to a certain extent a kinetic selectivity of desorption, although clearly smaller than the selectivity of adsorption. When the desorbed alkylbenzenes are in the liquid state and the desorption agent in the gaseous state, the removal of these alkylbenzenes from the bed is improved by circulating a stream of liquid diluent. After desorption of the alkylbenzenes, it is further necessary to remove the desorption agent from the bed before effecting a new adsorption of feed, particularly when such adsorption is to be carried out at a temperature lower than 130° C.; this is called the bed regeneration.

The removal of the desorption agent is obtained by increasing the temperature, preferably between 100 and 290° C. and/or by decreasing the partial pressure of the desorption agent. This partial pressure decrease can be achieved either by means of a stream of a poorly adsorbable gas, e.g. nitrogen, methane or ethane, or more advantageously, by means of the previously used diluent. In this latter case there can be circulated a stream of liquid or vaporized diluent or the diluent may be kept boiling inside the bed, resulting in the evolution therefrom of vapors with a high content of desorption agent.

The recovered fractions of alkylbenzenes, when in conformity with the desired specifications, are cleared from diluent and from adsorbing agent by stripping, distillation and/or decantation, according to the case, before being stored. If not, the fractions which require a second treatment are conveyed to other adsorbing beds. Generally at least one of the fractions has to be treated again: the first treatment provides for the elimination of some constituents from the feed, the second is used for purifying said constituents; of course the improper fraction from the second treatment may be recycled to the first one. The number of treatments is greater when the constituents of the feed separate less easily or when the number of constituents which must be individually separated is greater.

The accompanying drawing illustrates a particular embodiment of the invention, given by way of illustration and not limitation. The figure diagrammatically shows an installation comprising four adsorption units in series respectively referenced 1, 2, 3, and 4. A given amount of the feed to be fractionated is introduced through duct 5 in the tank 6. To this feed is added the non-adsorbed fraction issued from the adsorption unit 2 and conveyed through duct 7, as well as diluent introduced through duct 8 and coming from tank 9. This mixture is conveyed through duct 10 and valve 11 to the adsorption unit 1, the valves 12, 13, 14, 15, 16 being closed. In the adsorption unit the mixture separates into a non-adsorbed fraction and an adsorbed fraction. The first fraction contains the less adsorbable constituent(s) of the feed. By closing valve 11 and opening valve 16, it is conveyed, through duct 17, to the device 18, where it is cleared from the diluent (which issues through duct 38) before being discharged from the installation through duct 35. The second fraction contains the most adsorbable constituents. It is desorbed by simultaneous injection of diluent and desorption agent conveyed respectively through duct 19 and valve 12 and through duct 20 and valve 14, the valve 16 being closed. The desorption effluent is discharged through valve 15 and conveyed through duct 21 to the device 22 where it is cleared from desorbing agent before being conveyed through duct 23 to the tank 24, which also receives, through duct 25, the non-adsorbed fraction from adsorption unit 3. The recovered desorption agent is conveyed through duct 26 to the tank 27. After closure of valve 15 the desorption agent which has been adsorbed in place of the hydrocarbons is removed by a stream of vaporized diluent introduced through duct 19 and valve 12 and issuing through valve 13. This effluent is conveyed through duct 28 to a device 29 where the diluent is separated from the desorption agent; the first is then directed through duct 30 to the tank 9 and the second through duct 31 to the tank 27. The adsorption unit 1 and the associated devices are then available for a new operating cycle. The desorbed fraction from adsorption unit 1 and the non-adsorbed fraction issued from adsorption unit 3, which, as said before, are admixed in tank 24, are taken again in duct 32 in view of a further treatment in adsorption unit 2. The latter, as it is also the case for the adsorption units 3 and 4, is provided with the same associated devices as adsorption unit 1 and works in a similar way. It gives a non-adsorbed fraction which is joined to the fresh feed (duct 7) and an adsorbed fraction, thereafter desorbed, which is admixed with the non-adsorbed fraction from the adsorption unit 4 in view of a further treatment in adsorption unit 3. The latter produces in turn a non-adsorbed fraction and a desorbed fraction. The first one is recycled to the adsorption unit 2 and the second is treated, once more, in adsorption unit 4 which otherwise does not receive any non-adsorbed recycled fraction. The desorption effluent from said adsorption unit essentially consists of one or more of the most adsorbables constituents of the feed. It is cleared from the desorption agent in device 33 and from the diluent in device 34 before being discharged from the installation through duct 36. The diluent issues through duct 37. The operation of the process will be still better understood from Examples 4 and 5. In all examples the parts are by weight.

EXAMPLE 1

1000 parts of powdered zeolite CaX and 3 parts of also powdered anthenthrone are introuced in a vessel provided with a stirrer of adjustable speed and with a heating system. The two products are first admixed at room temperature; then the stirrer is operated at low speed and the mixture of powders is heated up to 280° C. The pressure in the vessel is then decreased to 15 millibars by means of a suction device. In order to avoid the jumps and the carrying away of powder, the pressure decrease is effected in a very progressive manner at a rate of 50 millibars per minute and under slight stirring. The powder is maintained at 280° C. under a pressure of 15 millibars for 2 hours; the heating is then stopped and nitrogen is introduced until the atmospheric pressure and the room temperature are again prevailing. By agglomeration of the powder in the form of spheroidal grains of about a 3 mm. diameter, there is obtained an adsorbent which can be used in fixed bed.

EXAMPLE 2

Example 1 is repeated; however, before the powder agglomeration step, all of the preceding operations before said step are renewed except that anthanthrone is substituted with pyromellitic dianhydride used in the same relative proportion, the operating pressure being unchanged and the temperature being 200° C.

EXAMPLE 3

1000 parts of CaX zeolite, in spheroidal grains of about 3 mm. of diameter, are placed in a vessel having an upper orifice and a lower orifice and provided at its lower end with a perforated plate for holding the zeolite in position. 3 parts of powdered anthanthrone are introduced by means of compressed air inside the bed through the upper orifice. Then, by means of the heating system and the suction device, the temperature is raised to 280° C. while the atmosphere of the vessel is discharged through the lower orifice until the pressure has decreased to 15 millibars. These temperature and pressure conditions are maintained for 3 hours. After cooling and re-establishment of the atmospheric pressure by introduction of nitrogen, the adsorbent is ready for use.

EXAMPLE 4

1000 parts of CaX zeolite, in spheroidal grains of about 3 mm. of diameter, are placed in a vessel similar to that of Example 2 and heated up to 280° C. under a pressure of 15 millibars for one hour. Then, by injection of nitrogen, the pressure is raised to 1 bar and the temperature is decreased to 100° C. The nitrogen injection is then stopped and a xylenic solution of anthanthrone is passed through the bed. This solution is obtained by percolating xylene at 100° C. in a column filled with 6 parts of anthanthrone grains held in position by a wire gauze. The grains have an initial diameter of about 3 mm. but their size is reduced due to the dissolving action of xylene and accordingly the mesh size of the wire gauze is only 0.5 mm.

The impoverished solution flowing from the zeolite bed passes again through the column of anthanthrone before being returned onto the zeolite. This circulation is maintained for 5 hours. Then the temperature of the adsorbent bed is raised to 140° C. while injecting a stream of 1000 parts per hour of pentane vapors having a 10% by weight steam content. This operation provides for the removal of all of the adsorbed xylene in about 30 minutes. The water adsorbed in place of xylene is in turn driven away by heating to 280° C. for 75 minutes in the presence of a stream of 1000 parts per hour of pentane vapors, replaced during the 15 last minutes with nitrogen. After cooling the adsorbent is ready for use.

EXAMPLE 5

This example relates to the purification of metaxylene. The treated feed consists of a eutectic mixture of metaxylene and paraxylene obtained by crystallization and having a metaxylene cotnent of 86%. The treatment is performed in a single stage with the use of an adsorbent based on CaX zeolite and anthanthrone, whose preparation is described in Example 2. This treatment is carried out in an adsorption unit containing 4000 parts of adsorbent.

Prior to any introduction of aromatic hydrocarbons, the adsorbent is cleared from atmospheric moisture and carbon dioxide which have been adsorbed during manipulation and storage. For this purpose, it is maintained at 280° C. for 1 hour under a current of normal pentane in the gaseous state at ordinary pressure. With the so-prepared adsorbent, 1000 parts of the xylenes feed diluted in 2500 parts of liquid normal pentane, acting in this case as a poorly adsorbable solvent, are introduced into the adsorption unit. The liquid phase is kept in contact with the solid at room temperature for 12 minutes during which nearly one half of the xylenes feed is adsorbed, which corresponds to 60% of the adsorbent capacity; the non-adsorbed liquid is withdrawn, said withdrawal being completed by a rinsing with pentane. The non-adsorbed fraction contains 450 parts of pure metaxylene (purity higher than 99.5%) diluted in pentane which is separated by distillation. The adsorbed xylene fraction, which contains 72% of the meta isomer, is then desorbed at 140° C. under atmospheric pressure by means of a stream of 4000 parts per hour of pentane vapor having added thereto increasing amounts of steam: 1% by weight at the beginning, then 3%, then 10%.

The operation takes 20 minutes as a whole. The effluent is condensed by cooling and water separated by decantation. Pentane is removed from the hydrocarbon phase by distillation (the resulting xylene mixture is recycled to the crystallization unit which will again fractionate it into para-xylene and eutectic). The water adsorbed in place of the xylenes is removed in about 1 hour by means of a current of gaseous pentane (4000 parts per hour) at 280° under ordinary pressure. As before, the effluent is condensed and pentane separated from water by decantation. The decanted water and pentane can be used again, as well as the pentane recovered by distillation.

EXAMPLE 6

This example relates to the production of pure para-xylene.

The para-xylene contained in a mixture of para-xylene (21%) meta-xylene (50%), ortho-xylene (1%) and ethylbenzene (28%) is extracted with a yield higher than 99% and a purity of more than 99.7% in the installation diagrammatically shown in the accompanying drawing. The adsorbent, based on CaX zeolite, anthanthrone (0.3%) and pyromellitic dianhydride (0.3%) has been prepared as stated in Example 2. 6000 parts of adsorbent are contained in adsorption unit 1; 5000 parts in unit 2; 3800 parts in unit 3 and 1700 parts in unit 4.

Before any introduction of aromatic hydrocarbons, the adsorbent is cleared from atmospheric moisture and carbon dioxide which have been adsorbed during manipulation and storage; for this purpose, it is maintained at 280° C. for one hour, in a current of normal pentane in the gaseous state at ordinary pressure.

The adsorbent being thus prepared, 1000 parts of feed containing 210 parts of para-xylene are introduced, through duct 5 into the tank 6. To this feed is added the non-adsorbed fraction issued from adsorption unit 2 and conveyed through duct 8 from tank 9. This mixture is conveyed through duct 10 and valve 11 to the adsorption unit 1, the valves 12, 13, 14, 15 and 16 being closed. The liquid is kept in contact with the solid for 15 minutes. There is observed a temperature increase due to the heat of adsorption. The introduced mixture separates into a non-adsorbed fraction and an adsorbed fraction. The first one contains ortho-xylene, meta-xylene and ethylbenzene in amounts substantially equal to those of the fresh feed, but very little para-xylene. It is recovered from valve 16, valve 11 being closed. This recovery is completed by a final rinsing with pentane, for 5 minutes, at a flow rate of 6000 parts per hour, said pentane being introduced through duct 19 and valve 12. From valve 16, said first fraction is directed, through duct 17, to the distillation column 18 wherefrom pentane is removed, before being discharged from the installation through duct 35. The second fraction, retained by the adsorbent, does not contain ortho-xylene but meta-xylene and ethylbenzene in amounts substantially equal to those of the recycled fraction and almost all of the para-xylene supplied by the fresh feed and the recycling. This fraction is desorbed by simultaneous injection of pentane and water which are vaporized at their entrance in the adsorption unit. Valve 16 being now closed, pentane is supplied at a rate of 5000 parts per hour through duct 19 and valve 12. Water is injected through duct 20 and valve 14 at a progressive rate so as to control the heat liberation due to the adsorption of water in order to avoid that the temperature become higher than 140° C.: 50 parts per hour at the beginning, then 150, then 500 parts per hour. The total desorption time is 20 minutes. The effluent, issuing from valve 15, is directed through duct 21 to the condenser-decanter 22 wherein water is separated from the hydrocarbons. Said water is conveyed through duct 26 to tank 27; the hydrocarbons are conveyed through duct 23 to tank 24, which also receives through duct 25 the non-adsorbed fraction from adsorption unit 3. The water adsorbed in place of the xylenes is removed by heating at 280° C. for 1 hour under a current of 5000 parts per hour of pentane, vaporized when entering the adsorption unit. Said pentane is introduced through duct 19 and valve 12, valve 15 being closed.

The vapors issuing from valve 13 are directed, through duct 28, to the condenser-settler 29 wherein water separates from pentane. The latter is conveyed through duct 30 to the tank 9 and water through duct 31 to the tank 27. Adsorber 1 and its associated devices are then available for a new operating cycle. The desorbed fraction from adsorption unit 1 and the non-adsorbed fraction from adsorption unit 3, which, as previously mentioned, are admixed in tank 24, are taken again in duct 32 in view of a new treatment in adsorption unit 2 according to a similar procedure as that described in relation with adsorption unit 1; however the contact time required for the adsorption is only 8 minutes in this case. From adsorption unit 2 issues a non-adsorbed fraction which will be admixed to the fresh feed of the following cycle and a desorbed fraction which is admixed to the non-adsorbed fraction from adsorption unit 4 in view of a further treatment in adsorption unit 3 under the same conditions as for adsorption unit 2 including the contact time. Two new fractions are obtained. The non-adsorbed fraction is recycled to adsorption unit 2. The desorbed fraction is treated once more in adsorption unit 4 (which in other respects receives no xylenes recycling), the contact time being 13 minutes. The desorption effluent from this adsorption unit is cleared from water in the condenser-decanter 33 and from pentane in the distillation column 34. Through duct 36, there are thus recovered 209 parts of para-xylene containing less than 0.3% of ethylbenzene and substantially no other isomer.

EXAMPLES 7–8

Example 5 is repeated with various zeolites and by replacing anthanthrone with other active substances. The results are given in the following table:

| Zeolite | Active substance | Purity of the obtained metaxylene, percent |
|---|---|---|
| CaX | 0.5% by weight of N,N'-diphenylanthanthrimine. | 95 |
| NaY | 0.25% of anthanthrone | 96 |

It will be understood that, while there have been given herein certain specific examples of the practice of this invention, it is not intended thereby to have this invention limited to or circumscribed by the specific details of materials, proportions or conditions herein specified, in view of the fact that the invention may be modified according to individual preference or conditions without necessarily departing from the spirit of this disclosure and the scope of the appended claims.

We claim:
1. A new adsorption product containing a zeolite having pore diameter between 6 and 10 A. and at least one active substance of the general formula:

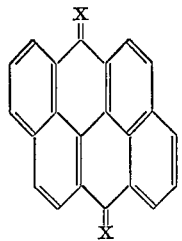

wherein X is an oxygen atom or a =N—R group, R being a monovalent hydrocarbon radical.

2. A new adsorption product according to claim 1 wherein the active substance is anthanthrone.

3. A new adsorption product according to claim 2 wherein the active substance is N,N'-diphenylanthanthrimine.

4. A new adsorption product according to claim 1 containing the active substance in a proportion of 0.001 to 1% by weight with respect to the zeolite.

5. A new adsorption product according to claim 2 further containing pyromellitic dianhydride or pyranthrone.

6. A new adsorption product according to claim 1 wherein the pore diameter of the zeolite is about 8 A.

7. A new adsorption product according to claim 1 wherein the zeolite is a CaX zeolite.

8. A process of manufacture of an improved adsorption product comprising the step of contacting a zeolite having pore diameters between 6 and 10 A. with an active substance of the general formula:

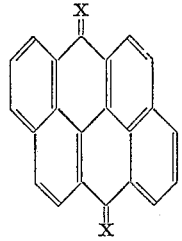

wherein X is an oxygen atom or a =N—R group, R being a monovalent hydrocarbon radical.

9. A process according to claim 8 wherein the active substance is used in a vaporized form, the vapor pressure of said substance being between 0.01 and 100 millimeters of mercury.

10. A process according to claim 8 wherein the active substance is used as a solution in a solvent.

11. A process according to claim 10 wherein the solvent is a saturated hydrocarbon or an aromatic hydrocarbon.

12. A process according to claim 11 wherein the solvent is a mixture of aromatic hydrocarbons containing 8 carbon atoms per molecule.

13. A process for separating alkylbenzenes from mixtures thereof comprising the steps of contacting said alkylbenzenes with an adsorption product according to claim 1 for a shorter time than that necessary to attain the equilibrium, separating the non-adsorbed hydrocarbons from the adsorption product, and desorbing the hydrocarbons adsorbed by said product.

14. A process according to claim 13, which is carried out in a plurality of successive contact zones, wherein the hydrocarbons adsorbed in each zone are desorbed and used as feed for the next zone, with the exception of the hydrocarbns desorbed in the last zone which constitute one of the final products of the process and wherein the non-adsorbed hydrocarbons, starting from the second zone, are recycled to the preceding zone, with the exception of the non-adsorbed hydrocarbons of the first zone, which constitute a second final product of the process.

References Cited
UNITED STATES PATENTS

| | | | |
|---|---|---|---|
| 3,036,983 | 5/1962 | O'Connor | 252—455 |
| 3,424,696 | 1/1969 | Coingt | 252—455 |
| 3,493,518 | 2/1970 | Jonassen et al. | 252—455 |
| 3,524,895 | 8/1970 | Chen et al. | 260—674 |
| 3,558,732 | 1/1971 | Neuzil | 260—674 |

DELBERT E. GANTZ, Primary Examiner

C. E. SPRESSER, JR., Assistant Examiner

U.S. Cl. X.R.

252—428, 430, 455 Z